J. KINTZ.

Assignor of one-half to THE CRAIGHEAD & KINTZ MANUFACTURING COMPANY.

EXTENSION STANDARD FOR LAMPS.

No. 10,974. Reissued Dec. 11, 1888.

WITNESSES

H. C. Newman.
E. S. Newman.

INVENTOR

Joseph Kintz,

By his Attorney

Marcus S. Hopkins.

N. PETERS, Photo-Lithographer, Washington, D. C.

UNITED STATES PATENT OFFICE.

JOSEPH KINTZ, OF BALLARD VALE, MASSACHUSETTS, ASSIGNOR OF ONE-HALF TO THE CRAIGHEAD & KINTZ MANUFACTURING COMPANY, OF SAME PLACE.

EXTENSION-STANDARD FOR LAMPS.

SPECIFICATION forming part of Reissued Letters Patent No. 10,974, dated December 11, 1888.

Original No. 389,577, dated September 18, 1888. Application for reissue filed October 6, 1888. Serial No. 287,428.

*To all whom it may concern:*

Be it known that I, JOSEPH KINTZ, of Ballard Vale, in the county of Essex and State of Massachusetts, have invented certain new and useful Improvements in Extension-Standards for Lamps, of which the following is a specification, reference being had to the accompanying drawings.

My invention relates to that class of extensible light-carrying devices—as, for example, piano-lamps—in which extensibility or variation in length is obtained by means of two telescoping portions provided with a locking mechanism which automatically locks the two portions in position, but which may be released at will, and in which a finger-piece is provided for releasing the locking mechanism.

The objects of my improvement are to produce a finger-piece having certain advantages not possessed by those now in use, and also to improve the construction of the locking mechanism, all as hereinafter set forth.

In the accompanying drawings I have represented my invention as embodied in what is commonly known as a "piano-lamp," and in the form now best known to me.

Figure 1:
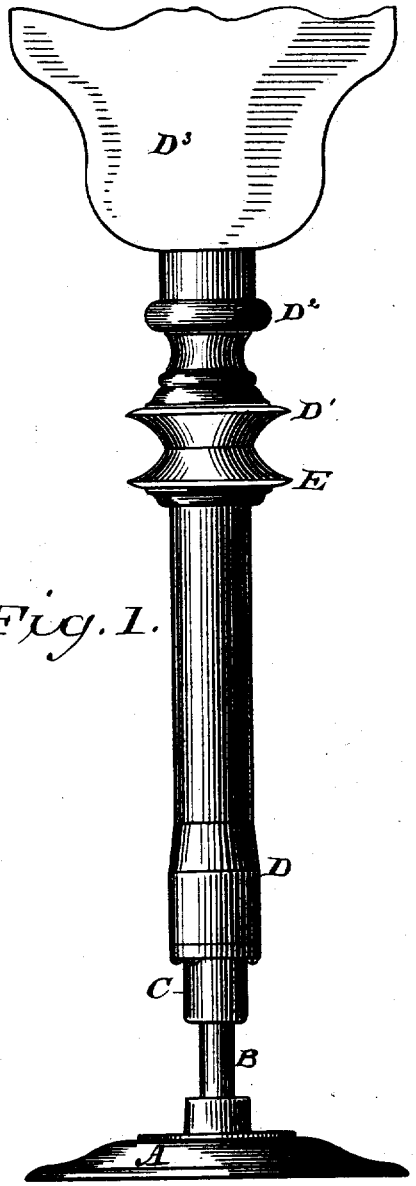
Figure 2:
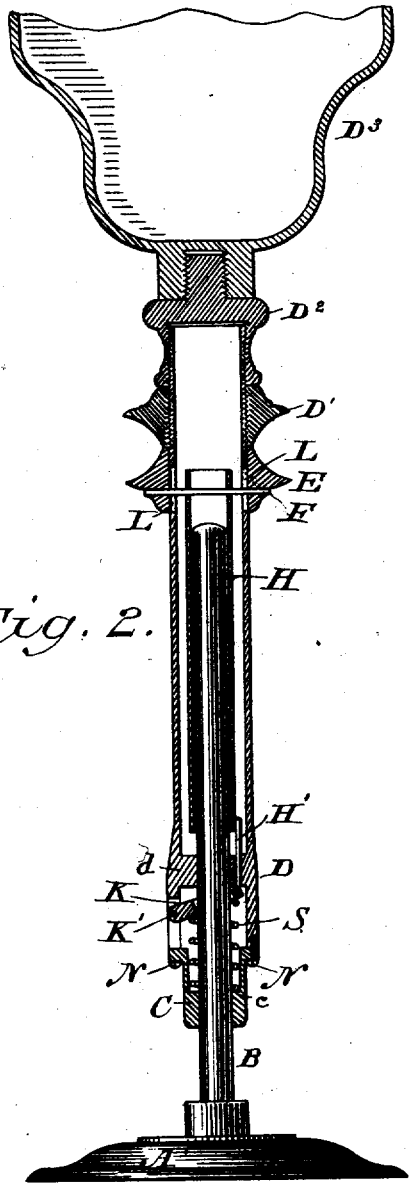

Figure 1 shows the structure in elevation, and Fig. 2 in vertical section.

I have shown my improved finger-piece or guide in its preferred form and as applied to a particular form of novel locking and releasing mechanism; but my finger-piece is adapted to operate other and well-known forms of lock, and my locking device is adapted to be released by other and well-known finger-pieces.

In the drawings, A represents a lamp-base, to which is attached a post, B, forming one member or portion of the telescoping apparatus. The other part of this apparatus is a tube, D, surrounding the post B and adapted to be adjusted longitudinally thereon. At the bottom portion, C, and also at the intermediate portion, *d*, the tube D has a sliding fit upon the post B, to permit of the longitudinal adjustment above referred to, and to the upper portion of D is attached a lamp-holder, $D^3$, by means of the screw-threaded head-piece $D^2$.

A two-part finger-piece is shown at D′ E, one part, D′, being secured to the lamp-carrying part D of the telescope, and the other part, E, being connected in the present instance by means of a pin, F, passing through slots L L in the tube D, with the tube or shell H. The lower portion of this tube H carries a small rod or pin, H′, adapted to operate upon a dog or lock, K, pivoted to the part D at K′, as shown. This dog is formed with a slot or aperture, through which the rod B passes, and a coiled spring, S, acting upon the dog, forces the edges of the slot against the rod B, after the well-known manner of a "ring-clamp," so called, and thus normally locks the base-rod B and lamp-carrying part D together. When, however, it is desired to break or release the lock, the downward motion of the sliding part E of the two-part finger-piece is communicated through the pin F, tube H, and rod H′ to the dog K, to force it down against the pressure of the spring, thus carrying the edges of the slot free from the post B and opening the lock. When the lock is thus broken, the part D, which carries the lamp, may be slid up or down relatively to the base to any desired point, and when the pressure upon the finger-piece E is released the dog K is again pressed upward by the spring S and the lock restored. It will be seen, therefore, that my improved finger-piece consists, essentially, of two parts—one secured to that element of the telescoping device which carries the light, while the other part is connected with an automatic locking mechanism, also connected to the light-carrying element and moving with it, the function of this other part being to unlock the locking mechanism when desired. The two parts of the finger-piece lie side by side, and their adjacent surfaces should be so formed that the finger of the person operating the structure, when pressed between them, acts against the part of the finger-piece connected with the locking mechanism and unlocks it to allow the light-carrying element to be moved. When the finger-pressure is released, the locking mechanism acts automatically to lock the structure. I have found in practice that the best results are obtained when the two parts of the finger-piece are made annular, with their adjacent surfaces forming a double wedge, and I have therefore so represented them in the drawings.

My improved locking device also, as will be seen, consists, essentially, of a slotted dog pivoted to the light-carrying element and surrounding the other element of the telescope, of a spring carried by the light-carrying element and tending normally to lock the dog upon the other element of the telescope, and of a movable shell surrounding this other element, and provided with a part arranged to strike and release the dog, and also connected with and carrying the externally-accessible finger-piece.

I have herein represented my present invention as embodied in a lamp intended for use upon a piano-forte or table; but, as is well known, the same structure may be readily used as a light-carrier pendent from the ceiling or projecting from the wall of a room. Furthermore, it should be noticed that in practice a structure like that shown in the drawings would ordinarily be provided with an ornamental exterior sleeve or shell (not represented) of well-known construction.

I claim—

1. In an extension-lamp having a movable light-carrier, a base or standard, and a locking mechanism, whereby the light-carrier is automatically locked at any desired position upon the base or standard, a finger-piece formed of two adjacent portions, one rigidly attached to the light-carrier and the other attached to the lock-releasing mechanism, and having their adjacent surfaces formed to permit the introduction between them of the finger of the person operating the lamp, whereby the lock may be released and the light-carrier raised and lowered at will, substantially as set forth.

2. The combination, with an extensible light-carrier consisting of an exterior tube carrying the light and an interior rod connected with the base or support, of a slotted dog pivoted to the exterior tube and surrounding the interior rod, a spring carried by the tube and adapted normally to lock the dog upon the rod, a movable shell placed within the exterior tube and surrounding the interior rod, a rod or pin connected therewith and adapted to press upon and release the dog, and an exteriorly-located finger-piece connected with the movable shell for operating it to release the dog, all substantially as set forth.

JOSEPH KINTZ.

In presence of—
FRANK J. SEIDENSTICKER,
HORACE CRAIGHEAD.